Patented July 5, 1927.

1,634,974

UNITED STATES PATENT OFFICE.

MAURO BUCCI, OF PHILADELPHIA, PENNSYLVANIA.

FACIAL COMPOSITION.

No Drawing. Application filed August 21, 1925. Serial No. 51,622.

This invention relates to facial compositions and it has more particular reference to a preparation especially useful for the cleansing of the skin such as commonly employed by barbers and hairdressers upon the human face to remove dirt and other secretions from the pores.

The object of my invention is to provide a facial clay or composition of hygienic character which is absolutely harmless in use and beneficial both as a cleanser as well as a preservative whereby the human skin is improved and maintained in a soft and healthy condition.

To this end the invention consists essentially of an admixture of apple juice, virgin clay, denatured or ethyl alcohol, lemon juice, honey, and cream. The clay, termed "virgin" above, is commonly known as natural clay of the purest kind, the principal gathering places thereof being in deep, still lakes or at sea bottoms considerable distances from the shore. This clay is particularly adapted for the use mentioned hereinbefore, since it is impermeable to water but shrinks to some extent when the moist mass is kneaded and allowed to dry.

As an example I compound my novel facial composition as follows:

½ oz. (15 grammes) of apple juice, 7 oz. (210 grammes) of virgin clay, 1 oz. (30 grammes) of denatured or ethyl alcohol, 1 oz. (30 grammes) of lemon juice, 1 oz. (30 grammes) of clear honey, 1 oz. (30 grammes) of milk cream.

To prepare the composition I strain the apple and lemon juices of all solid matter, and pass the virgin clay through a fine silk or cheese cloth to remove any coagulated portions. The ingredients are then thoroughly triturated for about one hour until emulsified, whereupon thirty drops of a suitable perfume is added. The emulsified compound is then done up in appropriate airtight containers and is ready for use in the well known ways usually adopted by hairdressers and barbers for effecting a facial massage.

From the foregoing example it is thought the invention will be well understood while its hygienic and preservative properties need no further amplification herein.

Having described my invention what I claim is:—

1. The herein described facial composition consisting of apple juice, virgin clay, denatured alcohol, lemon juice, honey and cream, triturated to emulsified composition substantially as set forth.

2. A facial composition comprising ½ oz. apple juice, 7 ozs. of virgin clay, 1 oz. of denatured alcohol, 1 oz. of lemon juice, 1 oz. of honey and 1 oz. of cream, triturated to an emulsified condition in the manner set forth.

In testimony whereof I affix my signature the 20th day of August, 1925.

MAURO BUCCI.